United States Patent [19]

Esswein

[11] Patent Number: 5,327,032

[45] Date of Patent: Jul. 5, 1994

[54] DUAL FLUX RING MULTIPLE POSITION ROTARY ACTUATOR

[75] Inventor: Theodore A. Esswein, St. Louis, Mo.

[73] Assignee: Carter Automotive Company, Inc., Southfield, Mich.

[21] Appl. No.: 18,960

[22] Filed: Feb. 18, 1993

[51] Int. Cl.⁵ .................... H02K 33/00; H02K 35/00
[52] U.S. Cl. .................... 310/36; 310/49 R
[58] Field of Search .................. 310/36, 46, 192, 258, 310/49 R, 31, 32, 39, 40 MM

[56] References Cited

U.S. PATENT DOCUMENTS

| | | | |
|---|---|---|---|
| 3,370,189 | 2/1968 | Haydon et al. | 310/49 R |
| 4,006,374 | 2/1977 | Nakagawa | 310/40 MM |
| 4,347,457 | 8/1982 | Sakamoto | 310/256 |
| 4,447,793 | 5/1984 | Gray | 310/36 X |
| 4,482,829 | 11/1984 | Tardieu et al. | 310/105 |
| 4,612,526 | 9/1986 | Vanderlaan et al. | 310/36 X |
| 4,976,237 | 12/1990 | Bollinger . | |
| 5,038,064 | 8/1991 | Fiorenza | 310/116 |
| 5,097,162 | 3/1992 | Wang | 310/49 R |

Primary Examiner—Steven L. Stephan
Assistant Examiner—Ed To
Attorney, Agent, or Firm—Lawrence J. Shurupoff

[57] ABSTRACT

An electrically-energized rotary actuator includes an annular stator ring having a plurality of slot-like magnetic flux obstructions spaced around the ring circumference. An associated rotor has two permanent magnets that are polarized along the rotor diameter to form a south pole at one point on the rotor periphery and a north pole on a diametrically-opposed point on the rotor periphery. Two pole pieces are located at diametrically spaced points on the stator ring, each pole piece having a magnetic winding so that, when the windings are energized, a north pole and a south pole will be established for interaction with the poles formed by the rotor magnets. The flux obstructions in the stator ring cause the rotor to be deflected in steps so that the rotor has various discrete positions centered on the flux obstructions. The rotor can maintain a stable position uninfluenced by minor variations in the current applied to the stator windings.

8 Claims, 3 Drawing Sheets

DUAL FLUX RING MULTIPLE POSITION ROTARY ACTUATOR

BACKGROUND OF THE INVENTION

1. Field of the Invention

The present invention relates to a rotary electric actuator that functions as a torque motor. The rotor of the actuator is deflected in discrete increments in accordance with the current level applied to a coil.

2. Description of Prior Developments

U.S. Pat. No. 3,370,198 discloses a stepper motor wherein a permanent magnet rotor is rotated through a distance of one hundred eighty degrees in response to the application of a current pulse to a field coil. When the current pulse is removed, the rotor rotates through an additional one hundred eighty degree distance so as to assume its starting position.

The additional one hundred eighty degree motion is made possible by a second permanent magnet mounted on the stator frame so as to generate a magnetic flux moving in a reverse direction to the flux generated by the field coil. When the current pulse is removed from the coil, the magnetic flux generated by the second permanent magnet interacts with the poles of the rotor magnet to rotate the rotor an additional one hundred eighty degrees.

U.S Pat. No. 4,447,793 discloses a two-position rotary actuator that includes a rotor comprising a permanent magnet encircling a rotary shift. An electrical stator includes an annular magnetic housing and three radial pole pieces extending toward the rotor axis. An electrical winding encircles each pole piece. The windings are energizable so that current flow in one direction causes the permanent magnet to be aligned with one pole piece and a gap formed between the other two pole pieces. Current flow in the reverse direction causes the permanent magnet to be aligned with a second pole piece and a gap formed between the remaining pole pieces.

U.S. Pat. No. 5,097,162 discloses a stepper motor that includes a permanent magnet rotor and an annular stator encircling the rotor. The stator includes two semi-cylindrical pole pieces and a field coil concentric with the rotor axis.

U.S. Pat. No. 4,976,237 discloses an engine air intake valve operated by a rotary electrical actuator. An electrically conductive wire is wound around an annular cylindrical stator to define two diametrically-opposed magnetic poles. A rotor disposed within the cylindrical stator carries two permanent magnets that are polarized in a plane passing through the rotor axis.

When the electrical winding on the stator is energized by a D.C. voltage, the rotor is deflected in accordance with the magnitude of the applied voltage and current flow through the winding. The rotary electrical actuator is thus enabled to control the position of the associated air intake valve so as to obtain a range of different air flows through the valve.

U.S. patent application, Ser. No. 882,787, filed May 14, 1992, discloses a variation of the above-described electrical actuator wherein the magnetic poles on the stator ring are formed by rod-shaped pole pieces extending radially from the stator ring. The pole pieces include electrical windings which, when energized, establish two diametrically-opposed magnetic poles on the stator ring. The rod-shaped pole pieces and electrical windings can be low cost, commercially available solenoid coil assemblies.

In the above-described electrical actuator constructions shown in U.S. Pat. No. 4,976,237 and copending patent application, Ser. No. 882,787, the rotor deflection exhibits essentially a straight line or linear relationship with the applied current. Slight variations in the applied current thus produce corresponding variations in the rotor position.

There are some situations where it is desired that the rotor move stepwise to a predetermined deflected position and remain in that position even though the value of the applied current fluctuates slightly. The present invention is concerned with an electrical actuator having such a characteristic.

SUMMARY OF THE INVENTION

The present invention can be embodied in an assembly that includes an annular stator ring having several magnetic flux obstructions spaced along the ring circumference. Each flux obstruction can take the form of an axial slot or gap in the stator ring.

A rotor is arranged within the stator ring. Two permanent magnets are mounted on the rotor so that a permanent south pole is established at one point on the rotor and a permanent north pole is established at a diametrically-spaced point on the rotor. Two diametrically-opposed pole pieces are mounted on the stator ring in a plane extending generally normal to the rotor magnet plane when the rotor is in an undeflected condition. Although only two pole pieces are used in this embodiment, any number may be used, preferably an even number.

Electrical windings are carried on one or both pole pieces to establish diametrically-spaced north and south poles on the stator ring circumference when the electrical windings are energized. The magnetic strengths of such poles are related to the magnitude of the D.C. current flowing through the windings.

A principal feature of the invention is the provision of magnetic flux obstructions on the stator ring which tend to cause the deflected rotor to be stabilized so that its permanent magnets are diametrically aligned with the flux obstructions. A given electrical current input will deflect the rotor to a position wherein its permanent magnets are centered with the obstructions. Slight current increases above such current input do not disturb or change the rotor position, apparently because the remaining flux obstructions constitute a magnetic barrier that is too great for the rotor to overcome. However, with a sufficient increase in current flow, the rotor can advance to the next set of obstructions.

An advantage of the described arrangement is that the rotor can assume various discrete deflected positions and remain in such positions even though the current should subsequently vary slightly. Another advantage is that a given rotor position can be obtained without precise regulation of the applied current. The applied current can be slightly above or below a predetermined design value while still being effective for deflecting the rotor to a specific position.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENTS

Figure 1:
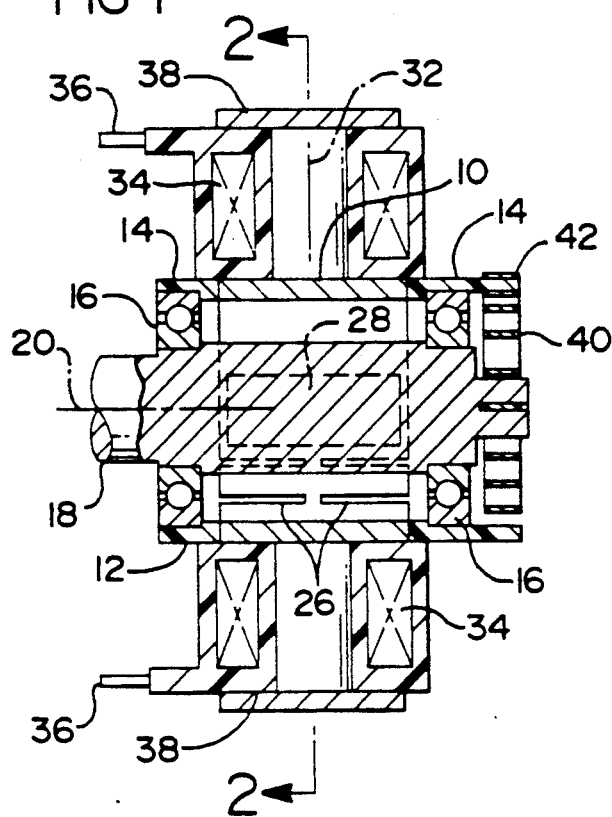
FIG. 1 is an axial sectional view taken through an electrical actuator constructed according to the invention.
Figure 2:
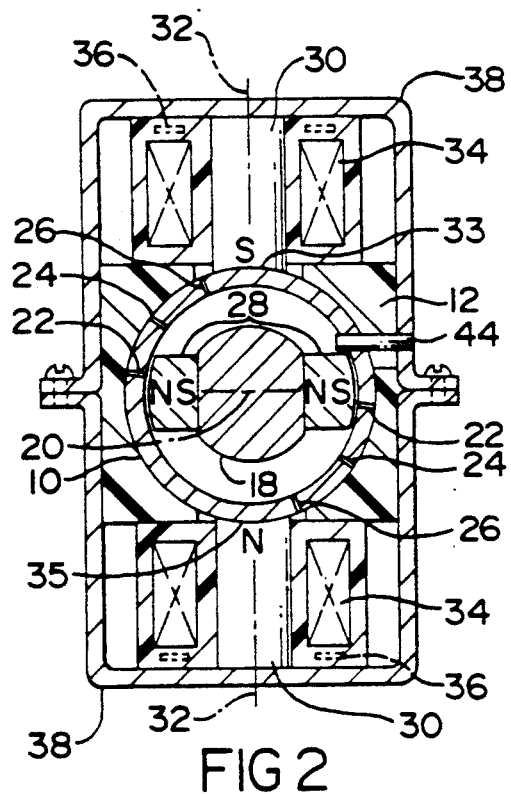
FIG. 2 is a sectional view taken on line 2—2 in FIG. 1.

As shown in FIGS. 1 and 2, the invention is directed to a rotary actuator having a cylindrical stator ring 10 encapsulated in a plastic mounting block 12. End portions 14 of the plastic block extend beyond ferromagnetic ring 10 to mount antifriction bearings 16 for a rotor 18, whereby the rotor is enabled to rotate around ring axis 20.

Ring 10, which acts as a primary flux ring, has three sets of axial slots 22, 24 and 26 extending therein at circumferentially-spaced points along the ring circumference. Each set of slots includes two diametrically-opposed slots located in a plane coincident with the stator ring axis. As seen in FIG. 1, a representative slot 26 extends the full axial length of ring 10, except for a short unslotted area at a midpoint along the length of ring 10.

Although three slots are shown in this example, any number could be used. For example, one, two, three or more pairs of slots could be used to respectively position the rotor in one, two, three or more predetermined actuated positions.

The unslotted area is merely for purposes of preserving the structural integrity of the ring and facilitating its handling while it is in the process of being encapsulated (molded) in plastic block 12. Separate ring segments could be used so as to define continuous axial slots, but the assembly of such individual cylindrical segments into a slotted cylinder could be difficult.

Rotor 18 has two flats formed thereon for mounting two permanent magnets 28 which are polarized in a plane passing through axis 20 so that a permanent south pole is established at one point on the rotor and a permanent north pole is established at a diametrically-spaced point on the rotor periphery. The permanent magnets have approximately the same axial length as stator ring 10 as can be visualized from FIG. 1.

Two rod-like pole pieces 30 extend radially outwardly from stator ring 10 along a diametrical line 32 passing through rotor axis 20. It is, of course, possible to use more than just two pole pieces in other embodiments. Each pole piece is encircled by an electrical coil winding 34 that carries electrical terminals 36, whereby a D.C. voltage can be applied to the windings.

The windings are wound so that when they are energized with a D.C. voltage, a south pole is established at stator connection point 33 and a north pole is established at stator connection point 35. The strengths of these magnetic poles are related to the value of the applied current. Not every pole piece needs to be encircled by a coil.

The magnetic flux generated in pole pieces 30 is circulated in a closed magnetic circuit that includes a ferromagnetic frame 38 which acts as a secondary flux ring surrounding stator ring 10 (a primary flux ring) and electrical windings 34. In the absence of electrical energization of windings 34, rotor 18 assumes the FIG. 2 position. A spiral leaf spring 40 (FIG. 1) has one end thereof attached to the plastic mounting block 12 and stator ring 10, as at 42. The other end of spring 40 is attached to rotor 18 so that the rotor is normally spring-biased in a counterclockwise direction as viewed in FIG. 2.

A non-magnetic pin 44 can be connected to stator ring 10, as shown in FIG. 2, to limit rotary motion of the rotor in the counterclockwise direction. As viewed in FIG. 2, the general plane of permanent magnets 28 is shown normal to the general plane 32 of pole pieces 30.

Figure 3:
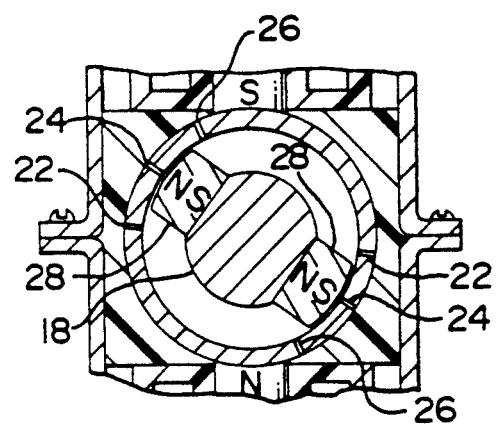
FIGS. 3 and 4 are fragmentary sectional views taken in the same direction as FIG. 2 but showing the rotor in different adjusted positions.
Figure 4:
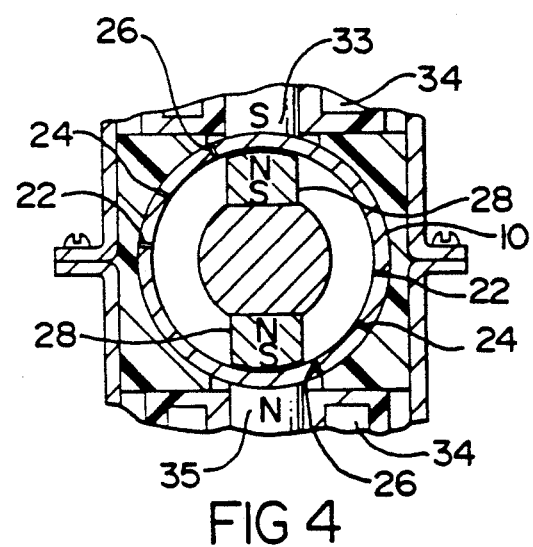

FIGS. 3 and 4 illustrate two positions of rotor 18 resulting from energization of windings 34. FIG. 3 shows the rotor deflected a relatively slight amount in the clockwise direction due to a relatively small current flow through windings 34. FIG. 4 shows the rotor in its position of maximum deflection, i.e. ninety degrees, resulting from a larger current flow through the electrical windings.

Rotor deflection results from the magnetic interaction of the two electrically-established poles 33 and 35 with the two permanent magnet poles at the rotor periphery, i.e. permanent magnets 28. In FIGS. 2 and 3, the north pole 35 attracts the south polarity on the rightmost magnet 28, whereas the south pole 33 attracts the north polarity on the leftmost magnet 28. The strength of the attractive force is related to the level of current flowing through windings 34.

Slots 22, 24 and 26 form magnetic flux obstructions, i.e. barriers to flow of magnetic flux across the gaps formed by the slots. These slots are narrow enough that they do not completely prevent the flux flow, rather they merely make it difficult for the magnetic flux to pass across the slot gaps without being diminished in intensity.

Comparing the position of rotor 18 in FIGS. 2 and 3, it will be seen that the rotor moves across slots 22 in order to reach the FIG. 3 position. Sufficient current is applied to windings 34 such that the magnetic attractive forces are high enough to bridge across slots 22 with enough magnitude to bring the rotor magnets 28 into radial alignment with slots 24.

If the current level is raised a sufficient amount, the rotor will be further rotated to a point wherein its magnets 28 are located in radial alignment with slots 26. Finally, at the maximum current level, the rotor will assume the FIG. 4 position wherein magnets 28 are in close proximity to the associated poles 33 and 35.

Figure 5:
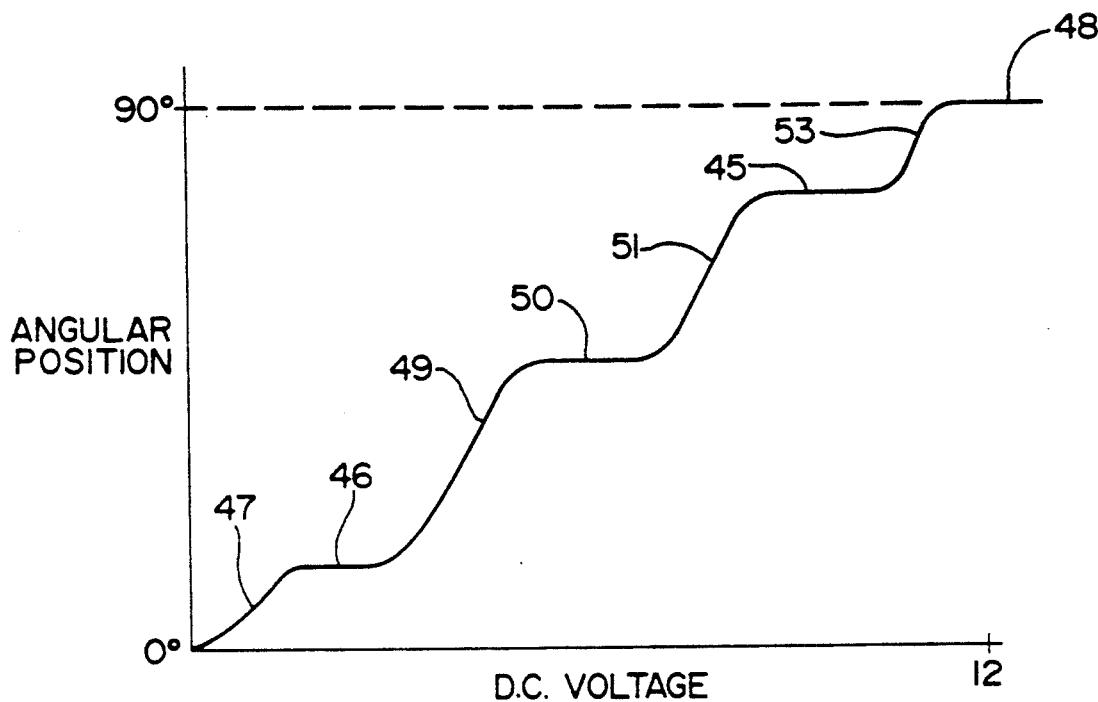
FIG. 5 is a graph depicting the relationship between the FIG. 1 rotor position and the D.C. current (voltage) applied to the stator windings.

FIG. 5 is a graph showing the general relation between applied D.C. voltage and current level and the rotor deflection. In FIG. 5 the zero degree position corresponds to the FIG. 2 condition, whereas the ninety degree position (horizontal line 48) corresponds to the FIG. 4 full deflection condition. Horizontal line 46 represents a rotor position aligned with slots 22, and horizontal line 50 represents a rotor position aligned with slots 24 as shown in FIG. 3. Horizontal line 45 represents a rotor position aligned with slots 26. Inclined line 47 (FIG. 5) represents the current increase needed to bring the rotor from the FIG. 2 position to a position aligned with slots 22. The other inclined lines 49, 51 and 53 represent current increases needed to advance the rotor into radial alignment with slots 24 and 26, and then into the FIG. 4 position.

The lengths of horizontal lines 46, 50, 45 and 48 are a measure of the stability of the deflected rotor, i.e. its ability to hold a given position in spite of fluctuations or variations in the current supplied to windings 34. The current can vary to a measurable extent without producing any movement or disturbance of the rotor. This is advantageous in those situations where it is desired that the rotor be deflected to a predetermined position and then remain at that position in spite of minor variations or fluctuations in the applied current or voltage.

If the current level is within a preselected range, represented by the length of horizontal line 46, 50, 45 or 48, the rotor will have a snap-type motion into a position where its permanent magnets 28 are diametrically centered or aligned between two associated slots as shown, e.g., in FIG. 3. The rotor will remain in the centered position until the current level is raised or lowered a measurable amount.

The device shown in the drawings is a four position construction, i.e. the rotor can have four discrete deflected positions in addition to the FIG. 1 undeflected position. The number of rotor positions is a function of the number of magnetic flux obstructions (slots) formed in stator ring 10.

Figure 6:
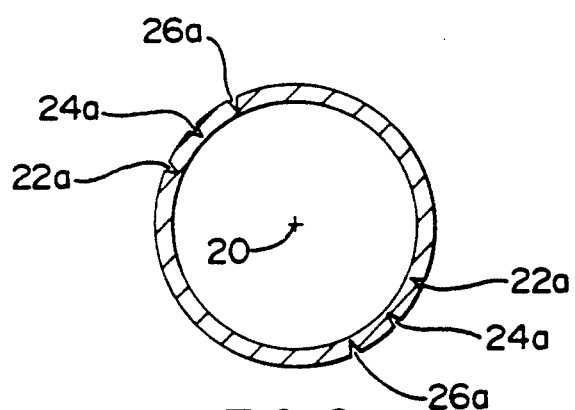
FIG. 6 is a sectional view taken through an alternate stator ring that can be used in practice of the invention.

FIG. 6 shows an alternate stator ring construction wherein the magnetic flux obstructions are formed by grooves 22a, 24a and 26a in the ring surface. With such an arrangement, the ring can have a somewhat greater structural integrity as compared to the ring structure shown in FIGS. 1 and 2.

The drawings show an arrangement wherein an electrical winding 34 is associated with each pole piece. However, only one of the windings is essential, i.e. one of the windings could be omitted, as in the arrangement depicted in the previously mentioned U.S. patent application, Ser. No. 882,787 per FIG. 4 of that application.

In practicing the invention, the magnets 28,28 are preferably selected so as to generate a magnetic flux in ring 10 that is only slightly less than the flux that would magnetically saturate the ring material. Thus, the magnets are sized according to the wall thickness, length and material used for ring 10 such that, when there is no electrically generated magnetic flux, the ring 10 will be almost saturated by the flux generated by magnets 28. Ring 10 is preferably formed of a soft magnetic material having a high magnetic flux saturation level. The magnet 28 sizing is for the purpose of achieving a desired rotor position and rotor torque with maximum magnetic flux across poles 30 and the rotor magnets.

If flux ring 10 were sized so that the magnet generated flux was significantly below the ring saturation level in the absence of coil 34 energization, the actuator would be relatively inefficient in operation. The amount of electrically-generated flux needed to saturate ring 10, over and above the flux in ring 10 due to magnets 28, contributes nothing to the torque generated by the actuator. Flux generated beyond the ring 10 saturation level is responsible for the torque developed by the actuator.

If magnets 28 were sized to develop magnetic flux in excess of the saturation level of ring 10, the rotor would tend to seek an at-rest location different than the location depicted in FIG. 2. In the absence of coil 34 energization, the rotor will rotate toward a position which minimizes the distance from the magnets 28 to the coil cores 30, i.e. the FIG. 4 condition. Such a position is not favorable to the generation of rotor movement as a response to coil 30 energization.

FIGS. 7 through 10 diagrammatically illustrate different rotor positions resulting from different current levels and electrical flux conditions. The electrically-generated flux is indicated by the dashed lines in these Figures.

Figure 7:
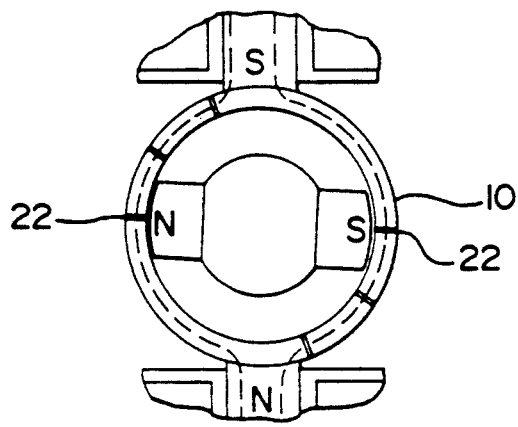
FIGS. 7 through 10 schematically illustrate different positions of a rotor used in the FIG. 1 actuator, resulting from different current levels applied to the actuator coils.

FIG. 7 shows the rotor in a location very near its at-rest position. The rotor is aligned with rotor slots 22. A small voltage is applied to the coils so that a relatively small flux is generated in ring 10. Only a minor amount of flux passes through the rotor to generate torque.

Figure 8:
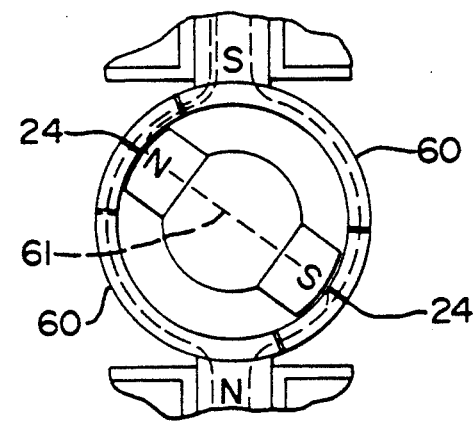

FIG. 8 shows the rotor in a position aligned with rotor slots 24. Coils 30 are subjected to a moderate voltage that is sufficient to generate an increased magnetic flux across or through the rotor. By substantially saturating the flux ring 10 with flux from magnets 28, the portions 60 of the ring divert the electrically-generated flux through the rotor as indicated by dashed line 61 in FIG. 8. Flux 61 produces the desired rotor torque.

Figure 9:
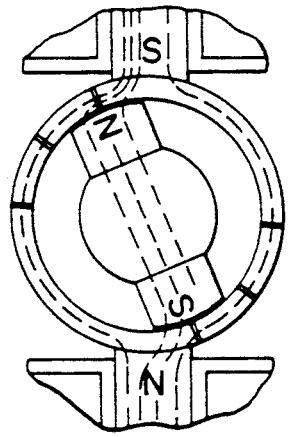
Figure 10:
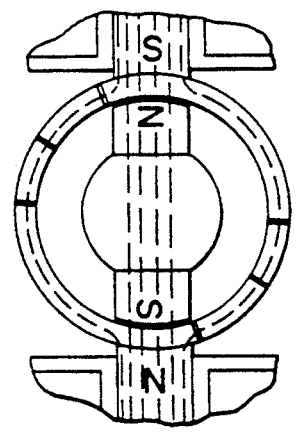

FIGS. 9 and 10 show additional rotor positions associated with increased coil energization levels. Ring 10 is in a saturated condition such that relatively high flux levels are directed through the rotor. By properly sizing magnets 28 to establish relatively high flux levels in ring 10, the electrically-generated flux can be effectively utilized by the rotor so as to achieve a reasonably high operating torque.

Some variations in configuration and component construction can be made while still practicing the invention since the drawings are intended to be illustrative and not completely definitive as regards various structural possibilities usable under the inventive concept.

What is claimed is:

1. A annular rotary actuator, comprising:
    a annular stator ring having a central axis and comprising a plural number of magnetic flux obstructions spaced around the ring circumference;
    a rotor having a central rotor axis and located within said stator ring for rotation around said central axis, said rotor having permanent magnet means located and polarized in a first plane coincident with the rotor axis;
    pole piece means extending from said stator ring in a second plane extending through said central rotor axis;
    a flux-conducting frame surrounding said stator ring such that said pole piece means is connected to said stator ring and to said frame;
    an electrical winding encircling said pole piece means for generating a magnetic circuit that passes through the magnet means;
    means for normally biasing said rotor to a position wherein the permanent magnet first plane is angularly related to the pole piece means second plane so that, when the winding is energized, the rotor is deflected from its normal position to an actuated position aligned with said flux obstructions; and said permanent magnet means generating a magnetic flux within said stator ring slightly less than necessary to magnetically saturate said stator ring.

2. The rotary actuator of claim 1, wherein said magnetic flux obstructions are formed as axial slots in said stator ring.

3. The rotary actuator of claim 2, wherein said axial slots are arranged in pairs of diametrically-opposed slots with each pair of slots located in a plane coincident with said central ring axis.

4. The rotary actuator of claim 3, wherein said stator ring comprises three pairs of slots spaced circumferentially from each other.

5. The rotary actuator of claim 1, wherein said first plane is transverse to said second plane.

6. The rotary actuator of claim 1, wherein said rotor biasing means comprises a spring having one end thereof connected to said rotor and one end thereof connected to said stator ring.

7. A rotary actuator, comprising:
an annular stator ring having a central axis and comprising magnetic flux obstruction means spaced around the ring circumference;
a rotor having a rotor axis and located within said stator ring for rotation around said central axis;
permanent magnet means carried by said rotor and polarized in a first plane coincident with the rotor axis;
a pole piece extending from said stator ring in a second plane extending through said central axis;
a flux-conducting frame surrounding said stator ring such that said pole piece extends between said stator ring and said frame; and
an electrical winding encircling said pole piece for generating a magnetic circuit that passes through the magnet means such that, upon energization of said winding, said rotor rotates to an actuated position spaced from said second plane and wherein said first plane is diametrically aligned with said means.

8. The rotary actuator of claim 7, wherein said stator ring is substantially fully saturated by magnetic flux generated by the permanent magnet means in the absence of electrical energization of the electrical winding.

* * * * *

UNITED STATES PATENT AND TRADEMARK OFFICE
CERTIFICATE OF CORRECTION

PATENT NO. : 5,327,032

DATED : July 5, 1994

INVENTOR(S) : Theodore A. Esswein

It is certified that error appears in the above-identified patent and that said Letters Patent is hereby corrected as shown below:

Column 6, line 46, claim 1, 'a annular' should read --an annular--

Column 8, line 17, claim 7, 'means' should read --flux obstruction means--

Signed and Sealed this

Twentieth Day of September, 1994

Attest:

BRUCE LEHMAN

Attesting Officer

Commissioner of Patents and Trademarks